United States Patent
Larose et al.

(10) Patent No.: US 11,027,434 B2
(45) Date of Patent: Jun. 8, 2021

(54) TELEPRESENCE CONTROLLER AND SYSTEM USING MAGNETORHEOLOGICAL FLUID CLUTCH APPARATUSES

(71) Applicant: EXONETIK INC., Sherbrooke (CA)

(72) Inventors: Pascal Larose, Sherbrooke (CA); Jean-Sebastien Plante, Sherbrooke (CA); Marc Denninger, Sherbrooke (CA); Guifre Julio, Sherbrooke (CA)

(73) Assignee: EXONETIK INC., Sherbrooke (CA)

( * ) Notice: Subject to any disclaimer, the term of this patent is extended or adjusted under 35 U.S.C. 154(b) by 287 days.

(21) Appl. No.: 16/329,395

(22) PCT Filed: Sep. 1, 2017

(86) PCT No.: PCT/CA2017/051034
§ 371 (c)(1),
(2) Date: Feb. 28, 2019

(87) PCT Pub. No.: WO2018/039803
PCT Pub. Date: Mar. 8, 2018

(65) Prior Publication Data
US 2019/0193278 A1    Jun. 27, 2019

Related U.S. Application Data

(60) Provisional application No. 62/382,989, filed on Sep. 2, 2016.

(51) Int. Cl.
*B25J 13/02* (2006.01)
*B25J 9/16* (2006.01)
(Continued)

(52) U.S. Cl.
CPC .......... *B25J 13/025* (2013.01); *B25J 9/1689* (2013.01); *B25J 13/085* (2013.01); *B25J 13/088* (2013.01);
(Continued)

(58) Field of Classification Search
CPC ...... B25J 13/025; B25J 9/1689; B25J 13/085; B25J 13/088; F16D 37/02; F16D 2037/004; F16D 2037/001; G05B 2219/40195
(Continued)

(56) References Cited

U.S. PATENT DOCUMENTS

| | | | |
|---|---|---|---|
| 6,424,885 B1 * | 7/2002 | Niemeyer | A61B 34/70 600/109 |
| 9,093,214 B2 * | 7/2015 | Gurocak | F16F 9/53 |

(Continued)

FOREIGN PATENT DOCUMENTS

| | | |
|---|---|---|
| CN | 101637913 A | 2/2010 |
| EP | 2736150 A2 | 5/2014 |

(Continued)

OTHER PUBLICATIONS

Li, Wenjun, "Design and Development of Magneto-Rheological Actuators with Application in Mobile Robotics" (2014). Western University, Canada, Electronic Thesis and Dissertation Repository. 2073. pp. 1-109, https://ir.lib.uwo.ca/etd/2073 (Year: 2014).*

(Continued)

*Primary Examiner* — Jaime Figueroa
(74) *Attorney, Agent, or Firm* — Norton Rose Fulbright Canada LLP (57) ABSTRACT

A telepresence controller is provided for interaction with a remote telepresence session to control haptic interactions between an end effector and the remote telepresence session. Force sensor(s) monitor force(s) applied to an end effector. Position sensor(s) monitor a position of the end effector. The telepresence controller communicates with the remote telepresence session to exchange position data and force data indicative of concurrent haptic movements of the end effector and an object in the remote telepresence session. Mag- (Continued)

netorheological fluid clutch apparatus(es) have an input adapted to be connected to a power source and configured to receive a degree of actuation (DOA) therefrom, the magnetorheological fluid clutch apparatus(es) having an output being actuatable to selectively transmit the received DOA to the end effector by controlled slippage. A force controller module determines a force input required on the end effector as a function of haptic events for the object in the remote telepresence session. A clutch driver module drives the magnetorheological fluid clutch apparatus with the controlled slippage being as a function of the force input.

20 Claims, 7 Drawing Sheets (51) Int. Cl.
B25J 13/08 (2006.01)
F16D 37/02 (2006.01)
(52) U.S. Cl.
CPC .... *F16D 37/02* (2013.01); *G05B 2219/40195* (2013.01)
(58) Field of Classification Search
USPC ........................................................ 700/245
See application file for complete search history.

(56) References Cited

U.S. PATENT DOCUMENTS

| | | | |
|---|---|---|---|
| 9,145,955 B2 | 9/2015 | Ferlay et al. | |
| 10,318,002 B2* | 6/2019 | Battlogg | A61F 2/64 |
| 2003/0136626 A1* | 7/2003 | Ciaramitaro | F16D 37/02 |
| | | | 192/57 |
| 2010/0036393 A1* | 2/2010 | Unsworth | A61B 90/361 |
| | | | 606/130 |
| 2012/0234126 A1* | 9/2012 | Gosselin | B25J 3/04 |
| | | | 74/490.14 |
| 2013/0098187 A1 | 4/2013 | Pittini et al. | |
| 2014/0137679 A1* | 5/2014 | Pittini | H02K 7/1004 |
| | | | 74/89.23 |
| 2014/0316435 A1* | 10/2014 | Unsworth | A61B 34/37 |
| | | | 606/130 |
| 2016/0030122 A1* | 2/2016 | Unsworth | A61B 34/37 |
| | | | 345/632 |
| 2016/0332305 A1* | 11/2016 | Gonzalez | B25J 13/025 |
| 2016/0378131 A1* | 12/2016 | Battlogg | F16H 59/0217 |
| | | | 74/553 |
| 2017/0050310 A1* | 2/2017 | Kanaoka | B25J 9/1689 |
| 2017/0202605 A1* | 7/2017 | Shelton, IV | A61B 18/1445 |
| 2017/0333140 A1* | 11/2017 | Unsworth | G06F 3/0308 |
| 2018/0029225 A1* | 2/2018 | Plante | B25J 9/0078 |
| 2019/0128340 A1* | 5/2019 | Denninger | B25J 9/146 |
| 2020/0257369 A1* | 8/2020 | Battlogg | G06F 3/0338 |

FOREIGN PATENT DOCUMENTS

| | | |
|---|---|---|
| WO | 2008104082 A1 | 9/2008 |
| WO | 2011039341 A1 | 4/2011 |
| WO | 2015166932 A1 | 11/2015 |

OTHER PUBLICATIONS

Shafer et al, Development of High Performance Intrinsically Safe 3-DOF Robot, 2014 IEEE International Conference on Robotics & Automation (ICRA) Hong Kong Convention and Exhibition Center, May 31-Jun. 7, 2014, pp. 1-6 (Year: 2014).*
Yadmellat, Peyman, "Magneto-Rheological Actuators for Human-Safe Robots: Modeling, Control, and Implementation" (2013). Western University, Canada, Electronic Thesis and Dissertation Repository. 1853. 99 1-150, https://ir.lib.uwo.ca/etd/1853 (Year: 2013).*

* cited by examiner

TELEPRESENCE CONTROLLER AND SYSTEM USING MAGNETORHEOLOGICAL FLUID CLUTCH APPARATUSES

CROSS-REFERENCE TO RELATED APPLICATION

The present application claims the priority of U.S. Patent Application No. 62/382,989, filed on Sep. 2, 2016, and incorporated herein by reference.

FIELD OF THE APPLICATION

The present application relates generally telepresence sessions in a haptic context, such as for master and slave manipulators, and more particularly to telepresence sessions involving magnetorheological (MR) fluid clutch apparatuses.

BACKGROUND OF THE ART

Collaborative robots are designed to manipulate objects and interact with the environment. Safely detecting and controlling the forces robotic actuators apply to robotic elements and/or the environment prevents unnecessary hazards. Traditionally, stiff actuators have been utilized to generate large forces/torques that can be measured by force sensors. Forces exerted by the stiff actuators, however, are difficult to measure precisely: small errors in the detected sensor deflections may result in large force errors. Therefore, expensive high-precision force sensors may be required to cooperatively work with the stiff actuators. In addition, stiff actuators have generally low bandwidth controllability and therefore are not good absorbing shock loads, thereby limiting their applications in a collaborative robotic system.

Haptic devices form specific man-machine interfaces. A haptic device provides, on the one hand, control and, on the other hand, tactile sensation resulting from interactions with a remote telepresence session. A haptic device provides its user with force-feedback information on the motion and/or force input generated by the user, in response to haptic events occurring remotely or virtually. Applications for haptic devices are widespread, and include robotics, teleoperation, minimal invasive surgery, remote control of vehicle, simulators and computer-based games.

A characteristic of a haptic device is its force rendering capabilities when a virtual or remote contact with a hard body is simulated. To this end, high precision and accuracy actuators may be well suited. Combined with high mechanical stiffness and low mass/inertia, such haptic devices may be used, for example, as robot or manipulator for performing programmed tasks or as a haptic device where force constraints can be applied into the hands of the operator.

The combination of haptic feedback device with collaborative robots now being developed show promises for increasing the use of such devices in virtual reality or telepresence systems. Nonetheless, these known systems could benefit from further improvements. For example, although force feedback systems for robotic applications have been proposed in the past, the added cost and complexity of these proposed force feedback systems has often limited their implementation. Additionally, known force reflecting master/slave robotic arrangements without force sensors may not be ideal for implementation of tactile feedback to the system operator in all the actuation modes.

In light of the above, it would be desirable to provide improved devices, systems, and methods. It would also be desirable to provide improved robotic devices, systems, and methods, both for use in robotic telepresence systems and other robotic applications. It would be beneficial if these improvements enhanced the operator's control over, and tactile feedback from, the robotic end effectors. It would further be desirable if these improvements did not unnecessarily complicate the system, and if these improved techniques would not unnecessarily increase the price of the device.

State-of-the-art distributed power devices used in haptic devices and collaborative robots rely on hydraulics or electromagnetic actuation. Hydraulic actuation is reliable towards mechanical jam, but has fundamentally limited dynamic response and efficiency. Furthermore, implementation of hydraulic systems into commercial applications may be problematic as hydraulics are prone to leakage, leading to increased maintenance costs. Moreover, hydraulic actuation is hardware intensive.

Electromagnetic actuation offers a clean alternative to hydraulic actuation. For high dynamic applications, the most common form of electromechanical actuation is found in direct-drive motors, which are prohibitively heavy. Device weight can be considerably reduced by providing a reduction ratio between the motor and the end-effector. Indeed, when coupled to reduction gearboxes, electromechanical actuators are lighter and less expensive than direct drive solutions, but their high output inertia, friction and backlash may diminish their dynamic performance.

Magnetorheological (MR) fluid clutch apparatuses are known as useful apparatuses for transmitting motion from a drive shaft with precision and accuracy, among other advantages, which could enhance the performance of electromechanical actuation systems.

SUMMARY OF THE APPLICATION

It is therefore an aim of the present disclosure to provide a telepresence controller that addresses issues related to the prior art.

It is a further aim of the present disclosure to provide a telepresence station that addresses issues related to the prior art.

It is still a further aim of the present disclosure to provide a telepresence system that addresses issues related to the prior art.

It is still a further aim of the present disclosure to provide a method for performing haptic interactions in telepresence that addresses issues related to the prior art.

Therefore, in accordance with a first embodiment of the present application, there is provided a telepresence controller for interaction with a remote telepresence session to control haptic interactions between an end effector and the remote telepresence session, the telepresence controller comprising: at least one force sensor adapted to monitor at least one force applied to an end effector, at least one position sensor adapted to monitor a position of the end effector, the telepresence controller being configured for communicating with the remote telepresence session to exchange position data and force data indicative of concurrent haptic movements of the end effector and an object in the remote telepresence session; at least one magnetorheological fluid clutch apparatus having an input adapted to be connected to a power source and configured to receive a degree of actuation (DOA) therefrom, the magnetorheological fluid clutch apparatus having an output being actuatable to selectively transmit the received DOA to the end effector by controlled slippage; a force controller module for determining a force input required on the end effector as a function of haptic events for the object in the remote telepresence session; and at least one clutch driver module to drive the magnetorheological fluid clutch apparatus with the controlled slippage being as a function of the force input Further in accordance with the first embodiment, the telepresence controller sends for instance the position data as obtained from the at least one position sensor to the remote telepresence session, and the force controller module receives the force data from the remote telepresence session.

Still further in accordance with the first embodiment, the telepresence controller sends for instance the force data as obtained from the at least one force sensor to the remote telepresence session, and the force controller module receives the position data from the remote telepresence system.

Still further in accordance with the first embodiment, the at least one force sensor includes for instance a sensor calculating the force from current of the magnetorheological fluid clutch apparatus.

Still further in accordance with the first embodiment, a plurality of the magnetorheological clutch apparatus are configured for instance to be connected to the end effector.

Still further in accordance with the first embodiment, a comparator module produces for instance a reference force from the position data, the reference force being calculated from a comparison of the current position of the end effector and of the position of the object in the remote telepresence session.

Still further in accordance with the first embodiment, the force controller module determines for instance the force input on the end effector from the reference force and the at least one force measured by the at least one force sensor.

Still further in accordance with the first embodiment, a position adjustor module scales for instance the position data, whereby a displacement resulting from the force input is a scaled proportion of a displacement of the object in the remote telepresence session.

Still further in accordance with the first embodiment, a force adjustor scales for instance the force data, whereby the force input is a scaled proportion of a force on the object caused by the haptic events in the remote telepresence session.

Still further in accordance with the first embodiment, the remote telepresence session is for instance virtual.

In accordance with a second embodiment there is provided, a telepresence station comprising: a telepresence controller as described above; the end effector; and at least one tensioning member being connected at one end to the output of the magnetorheological clutch apparatus and at the other end to the end effector so as pull the end effector upon actuation of the magnetorheological fluid clutch apparatus.

Further in accordance with the second embodiment, at least two of the tensioning member are for instance in antagonistic arrangement.

Still further in accordance with the second embodiment, wherein the end effector is for instance displaceable in a plurality of degrees of freedom.

Still further in accordance with the second embodiment, a plurality of the magnetorheological clutch apparatus are for instance configured to be connected to the end effector, with at least one of the magnetorheological clutch apparatuses paired to a respective one of the plurality of degrees of freedom.

In accordance with a third embodiment, there is provided a telepresence system to control haptic interactions between end effectors remote from one another, the telepresence system comprising: at least a pair of telepresence controllers, each of the telepresence controllers comprising at least one force sensor adapted to monitor at least one force applied to an end effector, at least one position sensor adapted to monitor a position of the end effector, the telepresence controller being configured for communicating with the other telepresence controller to exchange position data and force data indicative of concurrent haptic movements of the end effectors, at least one magnetorheological fluid clutch apparatus configured to receive a degree of actuation (DOA), the magnetorheological fluid clutch apparatus having an output being actuatable to selectively transmit the received DOA to the end effector by controlled slippage, a force controller module for determining a force input required on the end effector as a function of haptic events for the end effector operated by the other telepresence controller, and at least one clutch driver module to drive the magnetorheological fluid clutch apparatus with the controlled slippage being as a function of the force input.

Further in accordance with the third embodiment, a first of the telepresence controllers sends for instance the position data as obtained from the at least one position sensor to a second of the telepresence controllers, and the force controller module receives the force data from the second telepresence controller.

Still further in accordance with the third embodiment, a first of the telepresence controllers sends for instance the force data as obtained from the at least one force sensor to a second of the telepresence controllers, and the force controller module receives the position data from the second telepresence controller.

Still further in accordance with the third embodiment, the at least one force sensor includes for instance a sensor calculating the force from current of the magnetorheological fluid clutch apparatus.

Still further in accordance with the third embodiment, a plurality of the magnetorheological clutch apparatus are for instance configured to be connected to the end effector.

Still further in accordance with the third embodiment, a comparator module in either one of the telepresence controllers produces for instance a reference force from the position data, the reference force being calculated from a comparison of the current position of the end effector and of the position of the object in the remote telepresence session.

Still further in accordance with the third embodiment, one of the force controller modules determines for instance the force input on the end effector from the reference force and the at least one force measured by the at least one force sensor.

Still further in accordance with the third embodiment, a position adjustor module in either one of the telepresence controllers scales for instance the position data, whereby a displacement resulting from the force input is a scaled proportion of a displacement of the object in the remote telepresence session.

Still further in accordance with the third embodiment, a force adjustor in either one of the telepresence controllers scales for instance the force data, whereby the force input is a scaled proportion of a force on the object caused by the haptic events on the end effector operated by the other telepresence controller.

Still further in accordance with the third embodiment, one of the telepresence controllers operates for instance a virtual telepresence session.

In accordance with a fourth embodiment, there is provided a telepresence station comprising: a telepresence controller as described above; the end effector; a hydraulic transmission including a master cylinder and a slave cylinder adapted to transmit a force to the end effector, and an hydraulic hose between the master cylinder and the slave cylinder for transmission of hydraulic pressure therebetween; and a tensioning or compressing member being connected at one end to the output of the magnetorheological clutch apparatus and at the other end to the hydraulic transmission; whereby the hydraulic transmission converts the pulling or pushing action on either one of the end effector and the output into hydraulic pressure.

Further in accordance with the fourth embodiment, the force is calculated for instance from the pressure in the hydraulic hose.

Still further in accordance with the fourth embodiment, the pulling action is provided for instance by another one of the tensioning or compressing set.

Still further in accordance with the fourth embodiment, a plurality of the tensioning and/or compressing sets are for instance provided, the plurality of the tensioning and/or compressing sets being configured to share a single power source.

Still further in accordance with the fourth embodiment, a tensioning or compressing set is for instance used in conjunction with a force biasing member on the end effector.

Still further in accordance with the fourth embodiment, at least one of the master cylinder and the slave cylinder is for instance of rolling diaphragm type.

In accordance with a fifth embodiment of the present disclosure, there is provided a method for controlling haptic interaction between an end effector and a remote telepresence session, comprising: monitoring at least one force applied to an end effector, monitoring a position of the end effector, communicating with the remote telepresence session to exchange position data and force data indicative of concurrent haptic movements of the end effector and an object in the remote telepresence session, determining a force input required on the end effector as a function of haptic events for the object in the remote telepresence session, and driving at least one magnetorheological fluid clutch apparatus as a function of the force input to selectively transmit the received DOA to the end effector by controlled slippage.

Further in accordance with the fifth embodiment, communicating with the remote telepresence session comprises for instance sending the position data as obtained from the monitoring to the remote telepresence session, and receiving the force data from the remote telepresence session.

Still further in accordance with the fifth embodiment, communicating with the remote telepresence session comprises for instance sending the force data as obtained from the monitoring to the remote telepresence session, and receiving the position data from the remote telepresence system.

Still further in accordance with the fifth embodiment, monitoring at least one force includes for instance calculating the force from current of the magnetorheological fluid clutch apparatus.

Still further in accordance with the fifth embodiment, driving at least one magnetorheological fluid clutch apparatus includes for instance driving a plurality of the magnetorheological clutch apparatus configured to be connected to the end effector.

Still further in accordance with the fifth embodiment, a reference force is calculated for instance from a comparison of the current position of the end effector and of the position of the object in the remote telepresence session.

Still further in accordance with the fifth embodiment, determining the force input required on the end effector includes for instance determining the force input on the end effector from the reference force and the at least one force measured from the monitoring the at least one force.

Still further in accordance with the fifth embodiment, calculating the reference force is performed for instance in the remote telepresence session.

Still further in accordance with the fifth embodiment, the position data is for instance scaled, whereby a displacement resulting from the force input is a scaled proportion of a displacement of the object in the remote telepresence session.

Still further in accordance with the fifth embodiment, scaling the position data is for instance performed in the remote telepresence session.

Still further in accordance with the fifth embodiment, the force data is for instance, whereby the force input is a scaled proportion of a force on the object caused by the haptic events in the remote telepresence session.

Still further in accordance with the fifth embodiment, the method is for instance performed with a virtual reality program at the remote telepresence session.

Still further in accordance with the fifth embodiment, the method is for instance performed between two similar mechanical systems.

DESCRIPTION OF THE PREFERRED EMBODIMENTS

Figure 1:
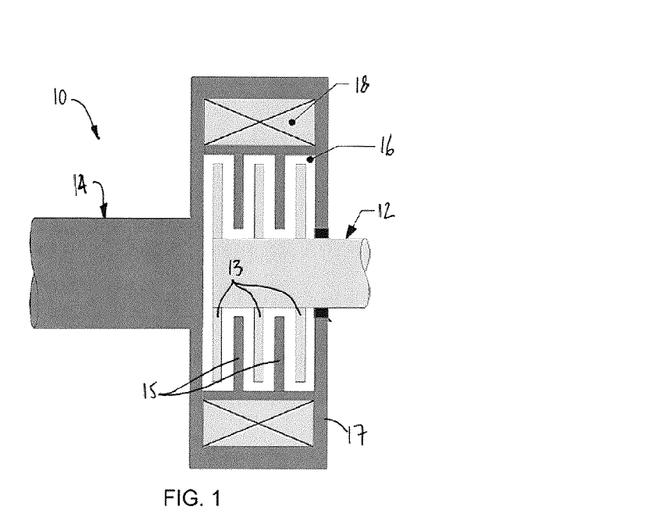
FIG. 1 is a schematic view of a magnetorheological fluid clutch apparatus used in systems of the present disclosure.

Referring to the drawings and more particularly to FIG. 1, there is illustrated a generic magnetorheological (MR) fluid clutch apparatus 10 configured to provide a mechanical output force based on a received input current. The MR fluid clutch apparatus 10 of FIG. 1 is a simplified representation of a MR fluid clutch apparatus that may be used in the systems described hereinafter. The MR fluid clutch apparatus that is used in the systems described hereinafter may have additional components and features, such as drums, redundant electromagnets, MR fluid expansion systems, etc. All the description of the embodiments hereafter will be done using MR fluid but Electrorheological(ER) fluid may also be used.

The MR fluid clutch apparatus 10 has a driving member 12 with radial disks 13, this assembly also known as input rotor. The MR fluid clutch apparatus 10 also has an output, for example in the form of a driven member 14 with annular plates 15 intertwined with the radial disks 13 to define an annular chamber(s) filled with an MR fluid 16, the annular chamber being delimited by a casing 17 that is integral to the driven member 14. The assembly of the driven member 14 and annular plates 15 is also known as the output rotor. In the example of FIG. 1, the driving member 12 may be an input shaft in mechanical communication with a power input (e.g. a motor), and driven member 14 may be in mechanical communication with a transmission to transmit a power output (i.e., force output, torque output). MR fluid 16 is a type of smart fluid that is composed of magnetisable particles disposed in a carrier fluid, usually a type of oil. When subjected to a magnetic field, the fluid may increase its apparent viscosity, potentially to the point of becoming a viscoplastic solid. The apparent viscosity is defined by the ratio between the operating shear stress and the operating shear rate of the MR fluid comprised between opposite shear surfaces—i.e., that of the radial disks 13 on the drive side, and that of the annular plates 15 and of the walls of the casing 17 in the annular chamber 17. The magnetic field intensity mainly affects the yield shear stress of the MR fluid. The yield shear stress of the fluid when in its active ("on") state may be controlled by varying the magnetic field intensity produced by electromagnet 18 integrated in the casing 17, i.e., the input current, via the use of a controller. Accordingly, the MR fluid's ability to transmit force can be controlled with the electromagnet 18, thereby acting as a clutch between the members 12 and 14. The electromagnet 18 is configured to vary the strength of the magnetic field such that the friction between the members 12 and 14 is low enough to allow the driving member 12 to freely rotate with the driven member 14 and vice versa.

Figure 2:
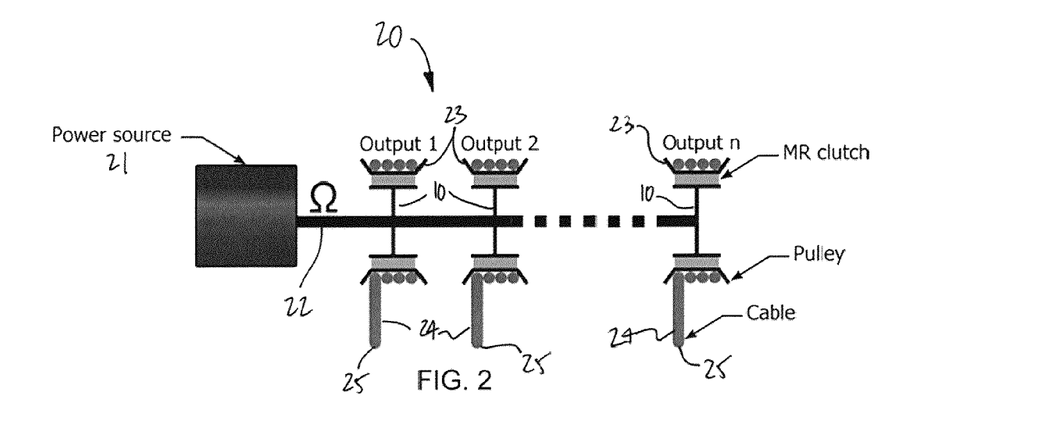
FIG. 2 is a schematic view of a power distribution arrangement in a cable-driven system in accordance with the present disclosure, using magnetorheological fluid clutch apparatuses.

Referring to FIG. 2, a cable-driven system in accordance with the present disclosure is generally shown at 20. The cable-driven system 20 has n MR fluid clutch apparatuses 10 receiving a torque input from a single power source 21 via a common power shaft 22 driven by the power source 21. For example, the power source 21 may be an electric motor, although other types of power sources may be used, such as hydraulic motors to name one among numerous other examples.

The MR fluid clutch apparatuses 10 are each equipped with an output member 23 upon which is mounted a cable 24, to form a tensioning set. The output member may practically be connected to the driven member 14 (FIG. 1) of the MR fluid clutch apparatuses 10 so as to rotate therewith. However, the output member may also have mechanisms between the driven member 14 and the output member 23 instead of being a direct drive. For example, the output member 23 may incorporate a reduction gearbox. The expression "output wheel" is used as an encompassing expression for equivalent parts, such as a pulley, a chainring, a sprocket, a nut, a screw, lever arm, etc. Likewise, the expression "cable" is used as an encompassing expression for equivalent parts, such as a tendon, rope, belt, chain, and like tensioning members used as transmission of degrees of actuation. The selection of the type of cable is based on the type of output wheel. The cable 24 has an end attached to the output wheel 23, a free end 25 attached to an output component, with a length of the cable being wound about the output wheel 23. A rotation of the output wheel 23, for instance as driven by the driven member 14 (FIG. 1), may wind additional cable length onto the output wheel 23, resulting in a pulling action at the free end of the cable 24. A pulling action on the free end 25 may alternatively result in an unwinding of the cable 24 from the output wheel 23, for instance when the MR fluid clutch apparatus 10 is in a slippage condition, i.e., when the pulling action on the free end 25 exceeds the force produced by the driven member 14. The cable-driven system 20 has n outputs for a single degree of actuation. Using continuous-slippage MR fluid clutch apparatuses 10 as tensioners in the cable-driven system 20 allows torque distribution from a single power source 21 amongst many outputs in order to drive possibly multiple DOFs. Although the MR fluid clutch apparatuses 10 can only produce torque in the direction they are being driven by the power source, this is not an issue in the case of cable-driven systems because of the cables' intrinsic inability to effectively transmit compressive loads.

Figure 3:
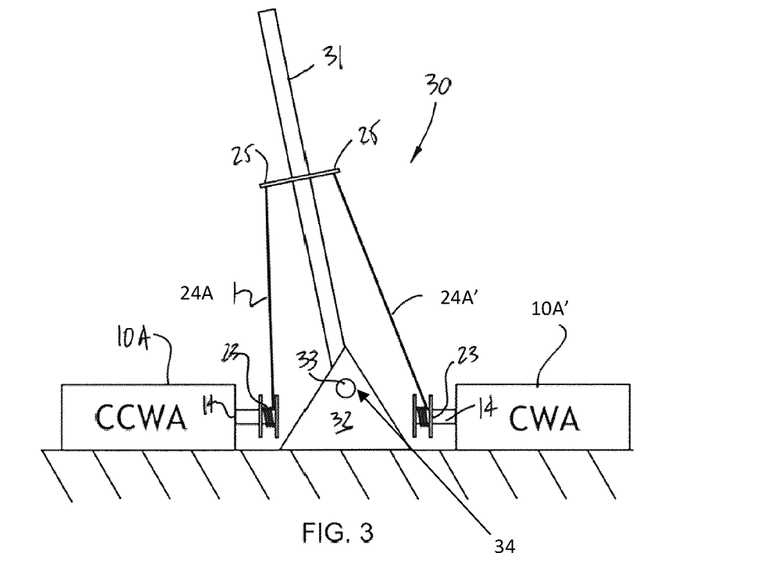
FIG. 3 is a schematic view of a cable-driven system using a common power source with a pair of magnetorheological fluid clutch apparatuses for antagonistic displacement of an end effector.

One particular embodiment of the cable-driven system of FIG. 2 is shown as 30 in FIG. 3. As the cable-driven system 30 has components in common with the cable-driven system 20 of FIG. 2, like components will bear like reference numerals. The cable-driven system 30 has a pair of the MR fluid clutch apparatuses, one of which is shown at 10A and the other of which is shown as 10B, the apparatuses 10A and 10B being connected to a common power source (not shown) as it is the case for the system 20 of FIG. 2. The MR fluid clutch apparatuses 10A and 10B are connected via cables 24A and 24' to a common end effector 31. The common end effector 31 is illustrated as being a pivoting arm, mounted to a base 32 by pivot 33. Accordingly, the end effector 31 is movable in one rotational degree of freedom (DOF). In spite of being driven by the common power source, the MR fluid clutch apparatuses 10A and 10B provide antagonistic pulling actions on the end effector 31, to enable reciprocating movement. Also, although the end effector 31 is shown as being movable in one rotational DOF, the end effector 31 could be connected to the base 32 by a translation joint, whereby the system 30 would provide a translational DOF. It is also considered to provide a single MR fluid clutch apparatus 10 and thus a single cable connected to the end effector 31, with an antagonistic force provided by a biasing member such as a linkage, spring, gravity, other type of actuators, etc (not shown). The biasing member may also include more complex mechanisms, such as a servo system, linear actuators, etc. In other words, any mechanism capable of opposing an antagonistic force to the end effector 31 may be used. This is applicable for given embodiments provided below as well.

In typical antagonistic cable-driven actuation systems, two actuators per degree-of-freedom (DOF) are generally used. Each actuator must therefore be designed to satisfy the maximum load for the degree-of-freedom it is driving. The DOF is actuated by two actuators because of the cables' inability to transmit compressive loads. Each DOF is hence actuated by two antagonistic actuators and generally only one is being activated at a time because of their opposing effect. For example, if a load is required to be produced in the clockwise direction, a clockwise actuator (CWA) is powered and the counter-clockwise actuator (CCWA) is unpowered and vice-versa if the load is required to be produced in the other direction.

In contrast, when centralizing the power source 21 (FIG. 2) in the system 30 of FIG. 3, the resulting system may lead to a compact and lightweight design. Moreover, since the continuous-slippage MR fluid clutch apparatuses uncouple the inertia of the power source 21 from the end effector 31, a lightweight power source, such as a high-speed electric motor coupled with a high-ratio reduction gearbox can be used without impacting the system's dynamic performance. Furthermore, the required load for the power source 21 can be tailored according to the application, leading to further weight reduction. For example, as the cable-driven system 30 utilizes a purely antagonistic actuation arrangement, the power source 21 is not required to produce the sum of the load capacity of both continuous-slippage MR fluid clutch apparatuses 10 it is driving, since only one of each pair can be active at the same time. The power source 21 can therefore be designed for only approximately one half of the total load requirement (i.e., the "offstate or free state" power of the clutch apparatus in slippage being greater than zero). This principle applies not only in the case of antagonistic architectures but it also applies in any application where multiple outputs do not need to be actuated simultaneously at their maximum load.

When maintained in slippage and used with a geared motor as power source 21, the MR fluid clutch apparatuses 10 in the cable-driven system 30 decouple the dynamic behavior of the motor from the outputs resulting in a low output inertia and high control quality since the high output inertia of the geared motor 21 is not reflected at the system output. The cable-driven system 30 may also provide an increased force accuracy as the non-linear behaviors of the geared motor (e.g. cogging, gear backlash, friction) are filtered by the MR fluid clutch apparatuses. The cable-driven system 30 also has relatively low mass and a reduced number of components since loads generated by a common geared motor 21 can be shared between a plurality of outputs. In some applications, the cable-driven system 30 may be reliable as a faulty geared motor can be disconnected from the output following clutch disengagement, when a redundant motor is available as back-up.

In the system of FIG. 3, information about the position of the end effector 31 may be obtained from a rotary sensor 34 placed at the pivot 33 of the end effector 31 or from sensor (not shown) on one of the pulley 23. Other types of position sensors may be used. Position may also be obtained from vision sensor technology. Force on the end effector 31 may be obtained from a force sensor (not shown) placed between the application location of the force and the pivot 33. Force on the end effector 31 may also be obtained from the difference of force generated in cable 24 and 24'. Force in cable 24 and 24' may be obtained from torque sensors (not shown) placed on output shaft 14 and 14' or from the current generated in the respective coil 18 of MR fluid clutch apparatuses 10A and 10A'. The force generated by MR fluid clutch apparatuses may be proportional to the current generated in the coils 18 of clutch 10A and 10A'. Other types of sensors are considered.

Figure 4:
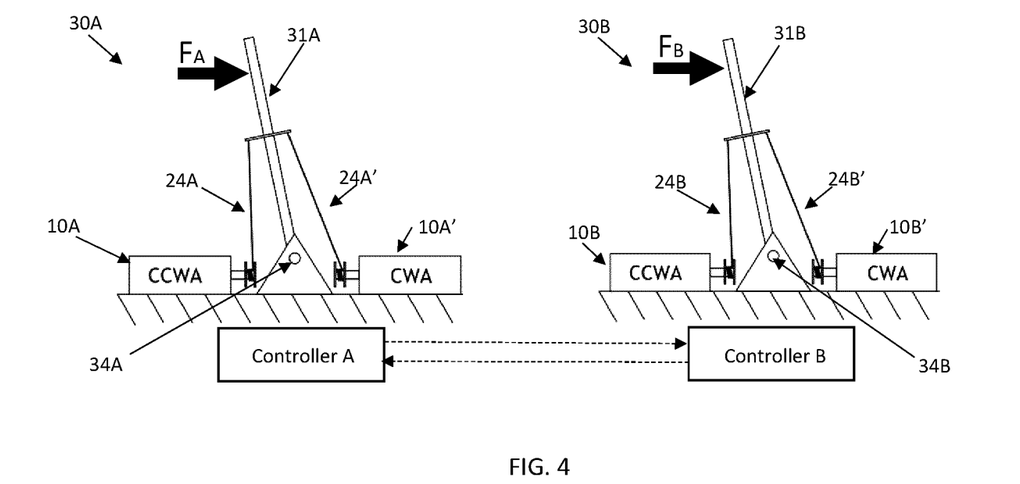
FIG. 4 is a schematic view of two cable-driven systems of FIG. 3 used in a telepresence system.

Referring to FIG. 4 there is illustrated a telepresence system using two of the cable-driven actuator of FIG. 3. 30A may be the master station and 30B may be the slave station. Stations 30A and 30B may be distantly located and may require communication between them in order to achieve telepresence function. Communication between stations 30A and 30B may be achieve by wire, wireless, optic, internet communication only to name a few. Station 30A is controlled by telepresence controller A and station 30B is controlled by telepresence controller B. Telepresence controllers A and B exchange information in order to achieve telepresence function. In a typical usage, FA is applied to end effector 31A and end effector 31B is concurrently moving, i.e., the end effectors 31A and 31B move synchronously and mirror each other's movements. Information about position of end effector 31A may be obtained from a rotary sensor 34A placed at the base of end effector 31A. Information from position sensor 34A is used by telepresence controller A and transmitted to telepresence controller B. Telepresence controller B, by adjusting the current in coils 18 of MR fluid clutch apparatuses 10B and 10B' may then adjust the force in cable 24B and 24B' in order to rotate the end effector 31B with the intent to have the end effector 31B emulate the movement of end effector 31A. Information about the position of end effector 31B may be obtained from rotary sensor 34B. If no obstacle is in the path of end effector 31B, end effector 31B may move freely in space while following the movement imposed on end effector 31A, for instance through human manipulations. If end effector 31B enters in contact with an object (not illustrated) or obstacle (not illustrated, then end effector 31B may be blocked and not able to follow the movement of end effector 31A anymore. Telepresence controller B may detect the obstacle and send the information to telepresence controller A. Telepresence controller A may then increase the current in the coil of either MR fluid clutch apparatus 10A or 10B in order to generate a force FA on end effector 31A that may be proportional to the force generated between the obstacle (not illustrated) and the end effector 31B. The user manipulating the end effector 31A may then "feel" on end effector 31A the force that is generated on end effector 31B, achieving telepresence function. As a simplified illustration, if FB that may illustrate the contact force between end effector 31B and an object (not illustrated) is inducing a tension T in cable 24B, the information of tension of cable 24B obtained from a force or torque sensor may then be exchanged from telepresence controller B to telepresence controller A and telepresence controller A may try to adjust the tension T in cable 24A' using similar sensors than on 30B in order to simulate the same force on end effector 31A. The magnitude of FA may then equal the magnitude of FB. With high bandwidth of MR fluid clutch apparatuses 10 and high bandwidth electronic communication between telepresence controller A and telepresence controller B, an economical telepresence system may be realized. For simplicity reasons, FIG. 4 is illustrating a single DOF system but systems with more DOF are considered. Moreover, for simplicity reason, 30A and 30B are illustrated as being the same device but 30A and 30B may be of different device types. 30A and 30B may have a different number of DOFs. Movement of end effector 31A and 31B may be different and magnitude of force FA may be different than magnitude of force FB.

In FIG. 4, either one of the stations may be replaced by a virtual system operating in a virtual world. Telepresence controller B may be a virtual controller operating a remote telepresence session, the expression "telepresence" designating that the session does not occur in situ with the station 30A. When station 30B being the slave system is replaced by a virtual system, there is achieved a virtual reality telepresence system. Information about restrictions created by virtual objects or virtual obstacle may be physically be "felt" by the operator of station 30A. This function may be interesting for many application like virtual carving of wood, virtual work on mechanical components or simulation of tele surgery on virtual bodies, only to name a few.

Figure 5:
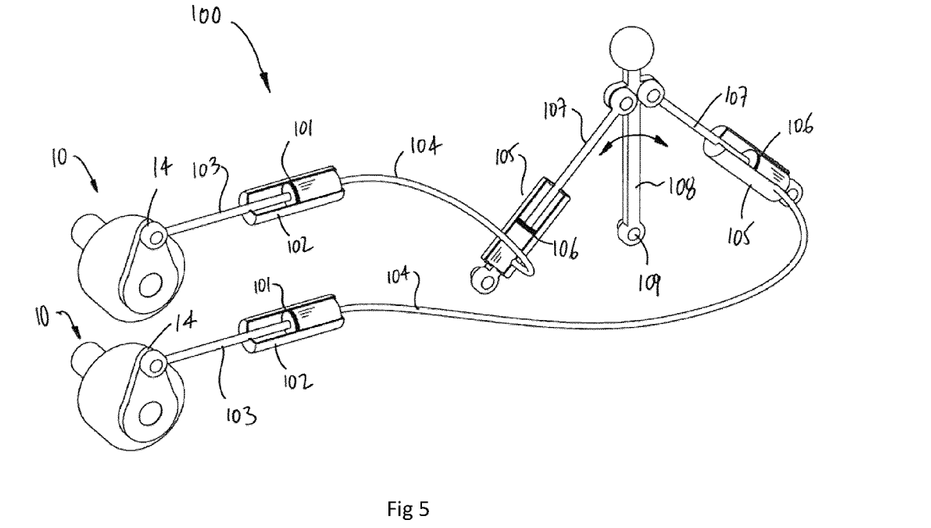
FIG. 5 is a schematic view of a fluid-driven system using a common power source with a pair of magnetorheological fluid clutch apparatuses for antagonistic displacement of an end effector.

Referring to FIG. 5, a system operated with a similar antagonistic approach than the one on FIG. 3 is shown at 100. However, instead of cables, the system 100 uses fluid pressure to actuate movements of an output, by way of hydraulic transmission units, similar to those employed in the robotic arm 170 of FIG. 7. In the illustrated embodiment, the system 100 has a pair of MR fluid clutch apparatuses 10 which, although not shown, may receive a degree of actuation from a common power source, for instance as in FIG. 2 or in FIG. 8. However, for simplicity, the power source and associated transmission are not illustrated in the FIG. 5. The driven member or output 14 of each MR fluid clutch apparatus 10 is an arm pivotally connected to a piston 101 of a master cylinder 102, by way of a rod 103. The system 100 may further have a flexible hose 104 extending from the master cylinder 102 to another cylinder, the slave cylinder 105. This slave cylinder 105 has a piston 106 and its rod 107 pivotally connected to an end effector 108 pivotally mounted to a ground at pivot 109.

In operation, the actuation of one of the MR fluid clutch apparatuses 10 results in movement of its associated piston 101 in the respective master cylinder 102. Pressurized fluid may as a result travel from the master cylinder 102, through the hose 104, and into the slave cylinder 105. This will cause a movement of the piston 106 that will push the output 108. The actuation of the other of the MR fluid clutch apparatuses 10 may result in a reciprocating movement of the output 108, in this illustrated embodiment of one rotational DOF. It is to be noted that the piston type may include various type (i.e. sealed piston, rolling diaphragm piston only to name a few).

Accordingly, the system 100 operates in a similar antagonistic approach as the system 30, yet with a pushing action (compressive load) instead of a pulling action (tensioning load) as when cables are used, whereby the system 100 has compressive sets as opposed to tensioning sets. The system 100 may be arranged to provide additional degrees of freedom of output. As an alternative to the presence of two MR fluid clutch apparatuses 10 in FIG. 5, the system 100 may use other forces to perform the antagonistic opposition, such as a spring, gravity, etc, against the action of one of the MR fluid clutch apparatuses 10.

Figure 6:
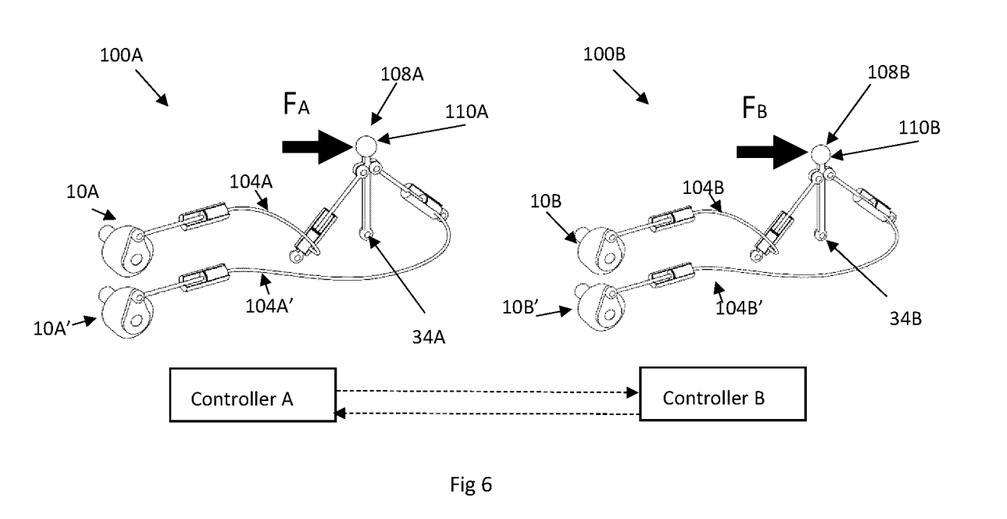
FIG. 6 is a schematic view of two fluid-driven systems of FIG. 5 used in a telepresence system.

Similarly to the system of FIG. 4, referring to FIG. 6, information about the position of about position of end effector 108A may be obtained from a rotary sensor 34A placed at the base of end effector 108A. Information from position sensor 34A is used by Controller A and transmitted to Controller B. Controller B, by adjusting the current in coils 18 of MR fluid clutch apparatuses 10B and 10B' may then adjust the force in hydraulic hoses 104B and 104B' in order to rotate the end effector 108B with the intent to have the end effector 108B to follow the movement of end effector 108A. Information about the position of end effector 108B may be obtained from rotary sensor 34B. If no obstacle is in the path of end effector 108B, end effector 108B may move freely in space while following the movement imposed on end effector 108A. If end effector 108B contacts an object (not illustrated) or obstacle (not illustrated), then end effector 108B may be blocked and not able to follow the movement of end effector 108A anymore. The force detected by end effector 108B may be obtained by a force sensor 110B. Using the force sensor information, telepresence controller B may detect the obstacle and send the information to telepresence controller A. Telepresence controller A may then increase the current in the coil of either MR fluid clutch apparatus 10A or 10B in order to generate a force FA on end effector 108A that may be proportional to the force generated between the obstacle (not illustrated) and the end effector 108B. the force on end effector 108A may be obtained by sensor 110A. The user manipulating the end effector 108A may then "feel" on end effector A a force that is generated on end effector B, achieving telepresence function.

As an alternative to force sensors 110A and 110B, if FB is the contact force between end effector 108B and an object (not illustrated), it induces a pressure P in hose 104B. The information of pressure in hose 104B may be obtained from a pressure sensor (not illustrated) that may be a cost-effective alternative to force sensors, with the force data then be transmitted from telepresence controller B to telepresence controller A. Telepresence controller A may then adjust the pressure in hose 104A' using a similar pressure sensor as in 100B in order to simulate the same force on end effector 108A. The magnitude of FA may then equal the magnitude of FB. Other types of sensors may be use as per described in FIG. 4. With the high bandwidth of MR fluid clutch apparatuses 10, high bandwidth electronic communication between telepresence controller A and telepresence controller B and cost-effective pressure sensors, an economical telepresence system may be realized.

For illustrative purposes, FIG. 6 illustrates a single DOF system but systems with more DOF are considered. Moreover, for simplicity, stations 100A and 100B are illustrated as involving the same device but stations 100A and 100B may use device types different from one another and do not require devices with the same number of DOFs. The concurrent movements of end effector 31A and 31B may be similar but not a 1:1 emulation, and the magnitude of force FA may be different than the magnitude of force FB, as driven by the telepresence controllers A and B, as described herein. Measuring the force of a device by using the pressure in the fluid hoses 104 may allow the realization of an inexpensive virtual reality, telepresence or robotic device. Applying the same principle to the position of the end effector may also be possible by installing a position sensor on one of the piston rod 103 located near the MR clutch apparatus 10. A position variation of the end effector 108 may be obtained by measuring the position variation of rod 103, lever 14 or other moving component located near the MR fluid clutch apparatus 10. The position may also be measured directly on the output 14 of MR fluid clutch apparatus 10. By combining the remote force detection and remote position detection, the telepresence controllers may achieve non-collocated sensing for zero wire virtual reality, telepresence or collaborative robots.

Similarly to the system of FIG. 4, slave station 100B may be replaced by a virtual system. Also, connection between the MR fluid clutch apparatuses 10 and the piston 101 and connection between the slave cylinder 105 and the end effectors 108 may be realized with various linkage types. A cable may also be used between the MR fluid clutch apparatuses 10 and the pistons rod 103 if the piston 101 configuration allow this (i.e. if the piston is of reverse type and the pressure is built on the face that is holding the piston rod 103). Also, in order to limit the number of pieces, it to be noted that both hoses could be plugged in different chambers of a same piston body, at the input or the output, the antagonistic opposition being applied on the piston, the rod transmitting the force to the end effector. Moreover, it is considered to provide a pair of one tensioning set (e.g., as in systems 20 and 30) with one compressive set (e.g., as in system 100), to provide antagonistic forces on a same DOF of an output. Among possibilities offered by such an arrangement, the anchor point for the tensioning set and the compressive set can be on the same side, same area and/or same location on the output. This may be a valuable feature when space is scarce on one side of the output.

Any one of these systems 20, 30, and 100 may use a brake that can immobilise the output in the driven position for an extended period of time without having to activate the MR fluid clutch apparatus 10 that leads to the driven position. The purpose of this is to limit the wear of the MR fluid in the MR fluid clutch apparatus 10 while the system is under the influence of a spring force or external force while the system is kept in an immobile state.

The systems described in FIG. 2 to FIG. 6 have a single DOF, for the simplicity of explanations. However, most of the applications of the technology described here may involve multiple DOF.

Figure 7:
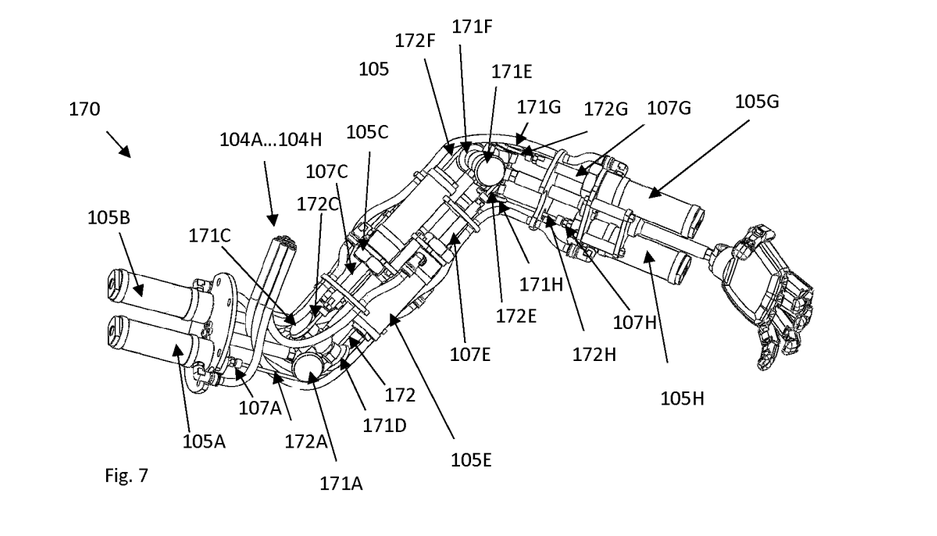
FIG. 7 is a schematic representation of a multiple DOF system telepresence system.

FIG. 7 is a schematic representation an arm 170 that is a multiple DOF robotic device that may operate by telepresence in a similar fashion as the stations 100A or 100B in FIG. 6 in order to achieve telepresence with higher reach. On the representation, multiple fluid hoses 104A to 104H are linking a remote base (shown in FIG. 8) to the arm 170. Each of the fluid hoses 104 may then be connected to a slave cylinder 105 in order to actuate a DOF in an antagonistic manner. Hydraulic hose 104A is connected to slave cylinder 105A that is acting on a piston rod 107A that may pull on a cable 172A that induces the rotation of a pulley 171A in order to actuate one DOF. A transmission composed of 104B, 105B, 107B, 171B and 172B may work antagonistically to the transmission 104A, 105A, 107A, 171A and 172A in order to control one DOF of the arm. Groupset with a C suffix may work antagonistically with groupset with a D suffix in a similar fashion in order to actuate another DOF. The same principle may continue on up to multiple DOF of actuation. In this hybrid hydraulic-cable representation, piston rods 107 are attached to cables 172 that are acting on pulley 171 in order to achieve translation-to-rotary converter but other types of conversion mechanisms may be used. Rotary hydraulics actuator may be used instead of translation hydraulic actuators and translation may be achieved instead of rotation. Moreover, antagonistic action may be realised by a single circuit that may work antagonistically with a biasing member, other type of actuator or gravity. Sensor may be integrated to the arm structure in order to be used as input control for the mechanism. On the schematics representation of FIG. 7, an arm 170 is represented but more complex devices with more DOF may be designed with the same principles. In a more complex system complete exoskeleton in contact with a human body may be developed.

Figure 8:
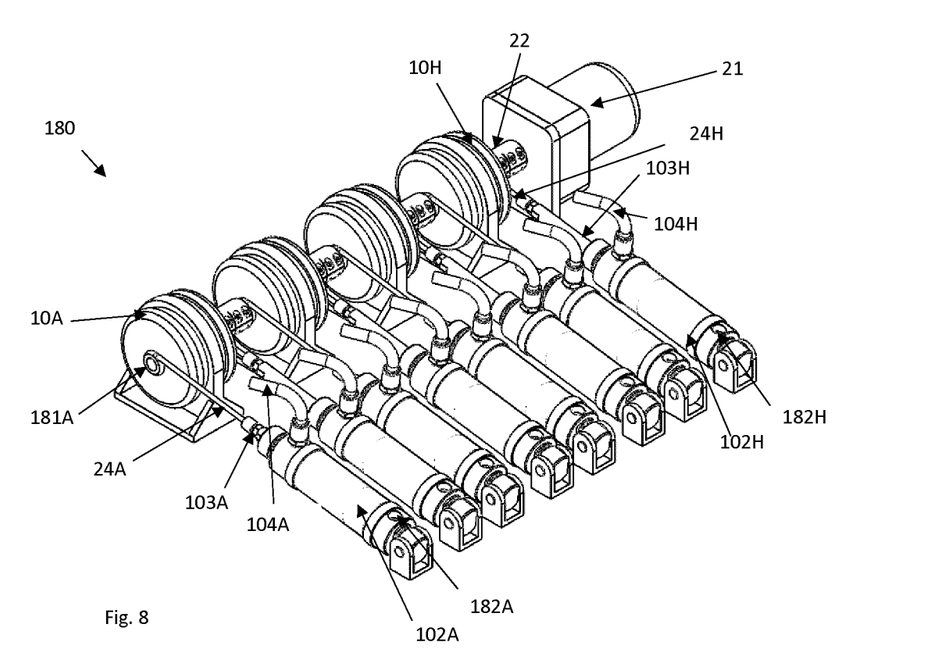
FIG. 8 is a schematic representation of the MR actuator group used in telepresence system.

FIG. 8 is a schematic representation of the MR actuator group that may be localised near the base of system of FIG. 7 in order to build pressure in the various fluid hoses 104. A single power source 21 provides power to MR fluid clutches apparatuses 10A to 10H using a common shaft 22. Each MR fluid clutch apparatus 10A to 10H may have respective pulleys 181A to 181H that pull on respective cables 24A to 24H. The pulley-cable arrangement may represent a rotary-to-linear conversion mechanism and other type of conversion mechanisms may be used. Each cable 104A to 104H may pull on respective piston rod 103A to 103H. Force applied in piston 103A to 103H may results in a force increase, and consequently a pressure increase in the piston or moving fluid, causing a piston displacement in respective master cylinder 102A to 102H. Pressure increases may me measured by respective pressor sensor 182A to 182H in order to get the pressure in each fluid groupset with suffixes A to H. Displacement sensors (not illustrated) may also provide the position of respective piston rod 103A to 103H. The pressure in master cylinder 102A may be equal to pressure in hose 104A that may be equal to pressure of slave cylinder 105A, hence measuring the pressure in master cylinder 102A may provide information on the pressure on slave cylinder 105A. Similarly, movement of piston rod 103A may be proportional to the movement of piston rod 107A, hence measuring the position of piston rod 103A may provide information on position of piston rod 107A. The telepresence controller may use the information on the pressure in piston 102A measured by sensor 182A and position of piston rod 103A in order to generate command torque for the MR clutch apparatus 10A that may generate a pulling force on cable 24A that may induce force or movement of within piston 102A. Proportional force and movement occurring in master cylinder 102A may occur in slave piston 105A, hence providing a method to remotely control the force and position of piston 105A without having to measure the force and position on master cylinder 105A. This may present the advantage that no sensor is required in the arm 170, using instead the sensors localised in the MR actuator base 180 remotely located. The combination of arm 170 and MR actuator base 180 may constitute an economical device part of the telepresence, virtual reality or collaborative robot device described previously.

Figure 9:
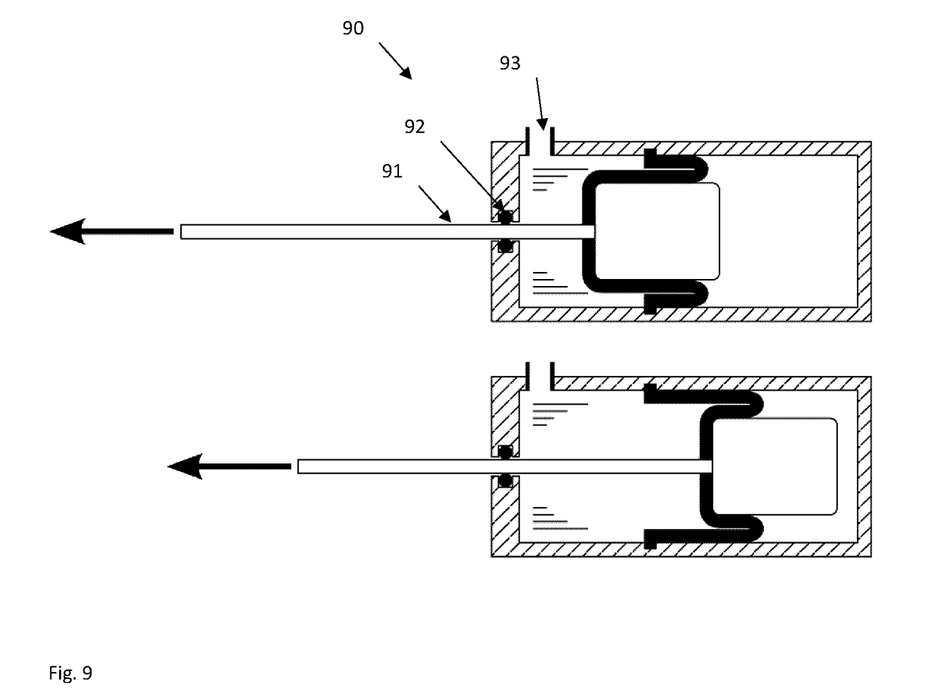
FIG. 9 is a schematic representation of a fluid piston that may be used in telepresence or robotic systems.

FIG. 9 is a schematic view of a fluid piston 90 that may be used in arm 170 and in MR base actuator 180. In such systems, standard fluid piston with sliding seal may present high stiction or static friction forces that may reduce the easiness of control of the devices. In order to reduce the stiction force, it may be an improvement to use rolling diaphragm piston. In such rolling diaphragm piston, the piston rod usually work in compression (pushing action). Arm 170 and MR base actuator 180 may use pushing rolling diaphragm piston but in some configuration where cables may be used as rotary-to-translation converter, it may be an improvement to have a rolling diaphragm piston 90 to be used in tension (pulling action). The embodiment shown at FIG. 9 is a rolling diaphragm piston 90 that is incorporating a seal 92 on a relatively small pulling rod 91. The relative small section of the pulling rod 91 in relation to the effective diameter of the piston itself may reduce the magnitude of the stiction force of the piston. Reducing this stiction force may present benefit for the control of the piston. The pulling force generated by the piston may be an order of magnitude superior to the stiction force generated at the seal of the piston rod and in some conditions the stiction force may be neglected, reducing the control complexity of a robotics or telepresence system. Hose 104 may be plug to the piston hole 93.

Figure 10:
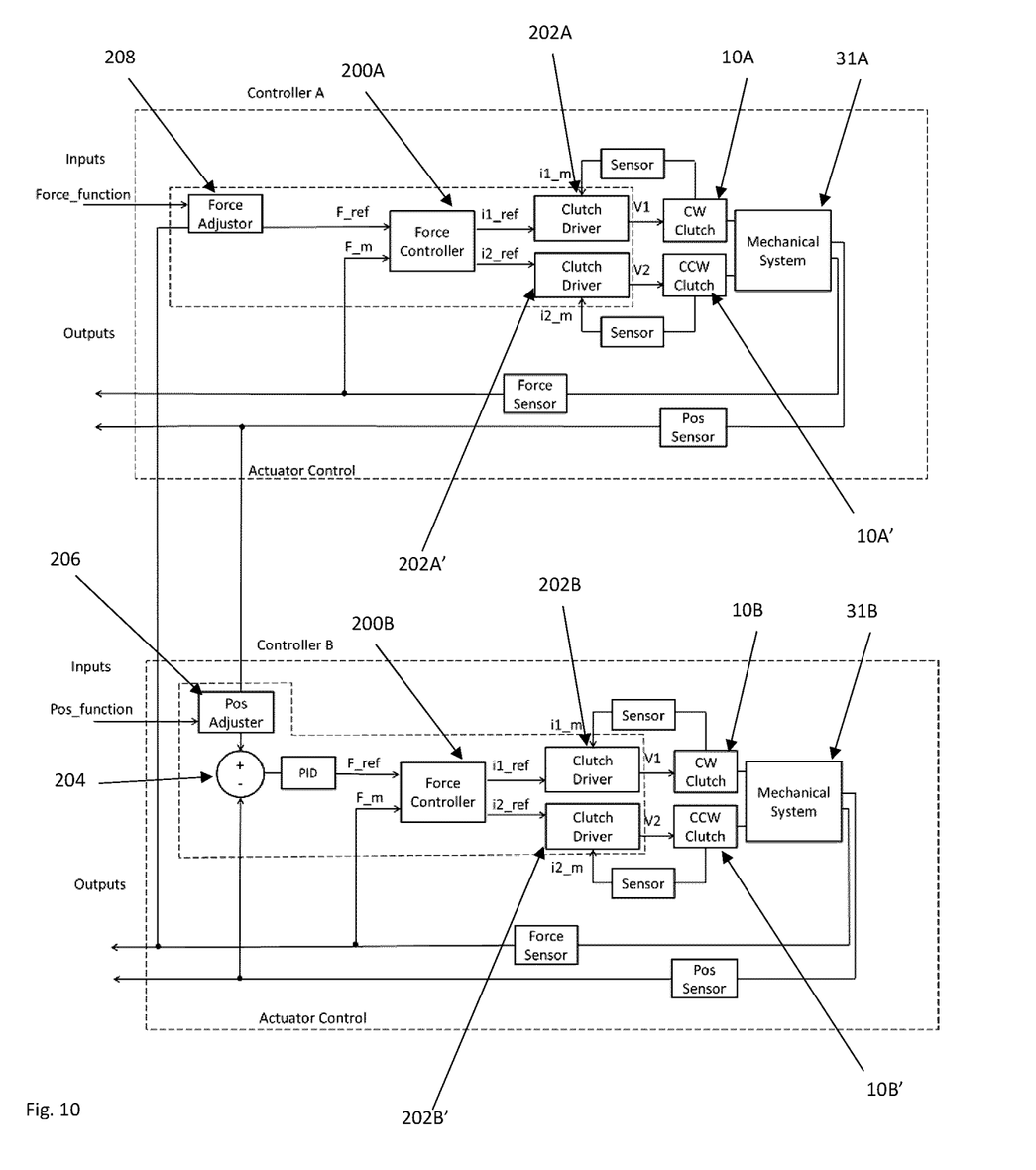
FIG. 10 is a block diagram of a telepresence system in accordance with the present disclosure.

Referring to FIG. 10, the telepresence system with telepresence controllers A and B is shown in greater details. The telepresence controllers A and B are used with some of the afore-mentioned components, such as the MR fluid clutch apparatuses 10, and the various force and pressure sensors. The telepresence controllers A and B may be part of telepresence stations along with the mechanical systems including hardware described above, namely the end effectors as part of any appropriate device, such as a robotic arm, along with the appropriate transmissions (such as cables, hydraulic transmissions, etc). The telepresence controllers A and B are for interaction with a remote telepresence session to control haptic interactions between the end effector 31 and the remote telepresence session, whether it be virtual or involve another telepresence station with another end effector 31. The telepresence controllers A and B may have one or more force sensor (e.g., 110A and 110B) adapted to monitor forces applied to the end effector 31.

The telepresence controllers A and B may have one or more position sensors to monitor a position of the end effector 31. The telepresence controller A and B are thus configured for communicating between each other, or with another remote telepresence session, such as a virtual one, to exchange position data and force data indicative of concurrent haptic movements of the end effector and an object in the remote telepresence session. The position data and force data will be used by the telepresence controllers A and B for the emulation of movements between telepresence stations, in haptic interaction.

One or more magnetorheological fluid clutch apparatuses 10 are configured to receive a degree of actuation (DOA) as detailed herein. The magnetorheological fluid clutch apparatuses have an output 14 being actuatable to selectively transmit the received DOA to the end effector 31 by controlled slippage.

The telepresence controllers A and B may be part of a computer, or like processor unit, and thus have the appropriate hardware and modules to perform the haptic interaction control. A force controller module 200 determines a force input required on the end effector 31 as a function of haptic events in the remote telepresence session. For example, the haptic event occurs when the remote end effector 31 contacts an obstacle. The force controller module 200 may therefore receive a reference force from the remote telepresence session, indicative of the haptic event. The telepresence controllers A and B may also have one or more clutch driver modules 202 to drive the magnetorheological fluid clutch apparatuses 10 with the controlled slippage being as a function of the force input determined by the force controller module 200.

In FIG. 10, the telepresence controller A sends the position data as obtained from the position sensor(s) to the remote telepresence session, and the force controller module 200A receives the force data from the remote telepresence session, in this case from force sensors of the telepresence controller B. However, the reverse arrangement is also possible. A comparator module 204 produces a reference force using the position data, such as the position readings from the position sensors in both telepresence controllers A and B. The comparator module 204 calculates the reference force from a comparison of the current position of the end effector 31A and of the position of the object in the remote telepresence session, such as an end effector 31B. The comparator module 204 is shown in FIG. 10 as being part of the telepresence controller B, but could alternatively be in the telepresence controller A. The force controller module 200 may consequently determine the force input on the end effector 31B in the illustrated scenario from the reference force F_ref provided by the comparator module 204 and the force(s) F_m measured by the force sensors. Also, as illustrated for telepresence controller A, the reference force F_ref may be provided by the telepresence controller B, for instance as measured or from a virtual reality session. The force controller module 200A may then calculate the force input using the reference force F_ref from the telepresence controller B with the force(s) measured by its force sensor(s) F_m. This arrangement of telepresence system therefore involves the transmission of position data to the telepresence controller B, and the reciprocal transmission of force data to the telepresence controller A, for concurrent haptic movement. In an embodiment, the movements of end effectors 31 mirror each other in position and force.

The telepresence system of FIG. 10 may optionally alter the haptic rendering, for instance by scaling the position and/or force. A position adjustor module 206, shown in telepresence controller B but alternatively present in telepresence controller A, is provided for scaling the position data, whereby a displacement of end effector 31A resulting from the force input is a scaled proportion of a displacement of the object (e.g., end effector 31B) in the remote telepresence session. For example, instead of having a 1:1 displacement ratio between end effectors 31, the end effector 31A may be manually displaced by 10 cm to cause a 1 cm displacement of the end effector 31B, in a 10:1 reduction by the position adjustor module 206. Likewise, a force adjustor 208, shown in telepresence controller A but alternatively present in telepresence controller B, may be provided for scaling the force data, whereby the force input of the force controller module 200A is a scaled proportion of a force on the end effector 31B as caused by the haptic events in the remote telepresence session.

A method for controlling haptic interaction between the end effector and a remote telepresence session may be described as having at least some of the following actions:
monitoring at least one force applied to an end effector,
monitoring a position of the end effector,
communicating with the remote telepresence session to exchange position data and force data indicative of concurrent haptic movements of the end effector and an object in the remote telepresence session,
determining a force input required on the end effector as a function of haptic events for the object in the remote telepresence session,
driving at least one magnetorheological fluid clutch apparatus as a function of the force input to selectively transmit the received DOA to the end effector by controlled slippage.
Communicating with the remote telepresence session may comprise sending the position data as obtained from the monitoring to the remote telepresence session, and receiving the force data from the remote telepresence session.
Communicating with the remote telepresence session may comprise sending the force data as obtained from the monitoring to the remote telepresence session, and receiving the position data from the remote telepresence system.
Monitoring at least one force may include calculating the force from current of the magnetorheological fluid clutch apparatus.
Driving at least one magnetorheological fluid clutch apparatus may include driving a plurality of the magnetorheological clutch apparatus configured to be connected to the end effector.
The method may include calculating a reference force from a comparison of the current position of the end effector and of the position of the object in the remote telepresence session.
Determining the force input required on the end effector may include determining the force input on the end effector from the reference force and the at least one force measured from the monitoring the at least one force.
Calculating the reference force may be performed in the remote telepresence session.
The method may include scaling the position data, whereby a displacement resulting from the force input is a scaled proportion of a displacement of the object in the remote telepresence session.
Scaling the position data may be performed in the remote telepresence session.

The method may include scaling the force data, whereby the force input is a scaled proportion of a force on the object caused by the haptic events in the remote telepresence session.

The method may be performed with a virtual reality program at the remote telepresence session.

The method may be performed between two similar mechanical systems.

Figure 11:
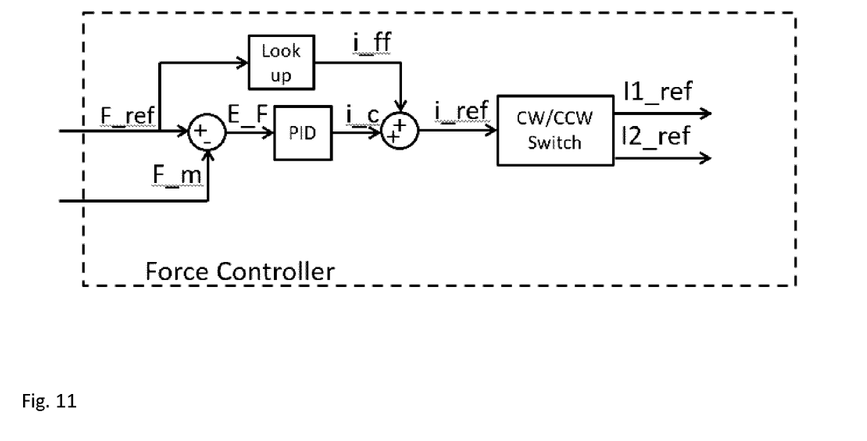
FIG. 11 is a block diagram of a force controller module of the present disclosure.

Referring to FIG. 11, an example of the force controller module 200 is shown, in which the measured force F_m is compared to a force reference F_ref and the difference, named force error (E_F) is conveyed to a Proportional-Integral-Derivative (PID) node. The output of the PID is added to the feed-forward current i_ff, which is a prediction of the current necessary to produce the given force reference F_ref, coded in a look-up table. The sum of the feed-forward current i_ff and the output of the PID (i_c) constitutes the power input, in the form of current reference i_ref for the clockwise/counterclockwise switch (CW/CCW Switch), in the event that a pair of MR fluid clutch apparatuses 10 are present as in FIG. 10. Since MR clutch apparatuses 10 can only produce torque in one direction, the CW/CCW Switch manages the current to the coils of each MR clutch apparatus, based on the power input i_ref in order for the telepresence controller to exert force in the appropriate direction via the respective MR fluid clutch apparatus 10.

The present disclosure provides improved telepresence control of robotic devices and systems. In general, the disclosure provides an improved master/slave arrangement for enhanced telepresence, particularly for actuation within a multiple degree of freedom device. By applying the present disclosure, high quality haptic feedback may be realized between a slave controlled by a remote master and high quality collaborative robotics may be achieved.

The invention claimed is:

1. A telepresence controller for interaction with a remote telepresence session to control haptic interactions between an end effector and the remote telepresence session, the telepresence controller comprising:
   at least one force sensor adapted to monitor at least one force applied to an end effector,
   at least one position sensor adapted to monitor a position of the end effector,
   the telepresence controller being configured for communicating with the remote telepresence session to exchange position data and force data indicative of concurrent haptic movements of the end effector and an object in the remote telepresence session;
   at least one magnetorheological fluid clutch apparatus having an input adapted to be connected to a power source and configured to receive a degree of actuation (DOA) therefrom, the magnetorheological fluid clutch apparatus having an output being actuatable to selectively transmit the received DOA to the end effector by controlled slippage;
   a force controller module for determining a force input required on the end effector as a function of haptic events for the object in the remote telepresence session; and
   at least one clutch driver module to drive the magnetorheological fluid clutch apparatus with the controlled slippage being as a function of the force input.

2. The telepresence controller according to claim 1, wherein the telepresence controller sends the position data as obtained from the at least one position sensor to the remote telepresence session, and the force controller module receives the force data from the remote telepresence session.

3. The telepresence controller according to claim 1, wherein the telepresence controller sends the force data as obtained from the at least one force sensor to the remote telepresence session, and the force controller module receives the position data from the remote telepresence system.

4. The telepresence controller according to claim 1, wherein the at least one force sensor includes a sensor calculating the force from current of the magnetorheological fluid clutch apparatus.

5. The telepresence controller according to claim 1, comprising a plurality of the magnetorheological clutch apparatus configured to be connected to the end effector.

6. The telepresence controller according to claim 1, further comprising a comparator module to produce a reference force from the position data, the reference force being calculated from a comparison of the current position of the end effector and of the position of the object in the remote telepresence session.

7. The telepresence controller according to claim 6, wherein the force controller module determines the force input on the end effector from the reference force and the at least one force measured by the at least one force sensor.

8. The telepresence controller according to claim 1, further comprising a position adjustor module for scaling the position data, whereby a displacement resulting from the force input is a scaled proportion of a displacement of the object in the remote telepresence session.

9. The telepresence controller according to claim 1, further comprising a force adjustor for scaling the force data, whereby the force input is a scaled proportion of a force on the object caused by the haptic events in the remote telepresence session.

10. The telepresence controller according to claim 1, wherein the remote telepresence session is virtual.

11. A telepresence station comprising:
    a telepresence controller according to claim 1;
    the end effector; and
    at least one tensioning member being connected at one end to the output of the magnetorheological clutch apparatus and at the other end to the end effector so as pull the end effector upon actuation of the magnetorheological fluid clutch apparatus.

12. A telepresence system to control haptic interactions between end effectors remote from one another, the telepresence system comprising:
    at least a pair of telepresence controllers, each of the telepresence controllers comprising
    at least one force sensor adapted to monitor at least one force applied to an end effector,
    at least one position sensor adapted to monitor a position of the end effector,
    the telepresence controller being configured for communicating with the other telepresence controller to exchange position data and force data indicative of concurrent haptic movements of the end effectors,
    at least one magnetorheological fluid clutch apparatus configured to receive a degree of actuation (DOA), the magnetorheological fluid clutch apparatus having an output being actuatable to selectively transmit the received DOA to the end effector by controlled slippage,
    a force controller module for determining a force input required on the end effector as a function of haptic events for the end effector operated by the other telepresence controller, and at least one clutch driver module to drive the magnetorheological fluid clutch apparatus with the controlled slippage being as a function of the force input.

13. The telepresence system according to claim 12, wherein a first of the telepresence controllers sends the position data as obtained from the at least one position sensor to a second of the telepresence controllers, and the force controller module receives the force data from the second telepresence controller.

14. The telepresence system according to claim 12, wherein a first of the telepresence controllers sends the force data as obtained from the at least one force sensor to a second of the telepresence controllers, and the force controller module receives the position data from the second telepresence controller.

15. The telepresence system according to claim 12, wherein the at least one force sensor includes a sensor calculating the force from current of the magnetorheological fluid clutch apparatus.

16. The telepresence system according to claim 12, comprising a plurality of the magnetorheological clutch apparatus configured to be connected to the end effector.

17. The telepresence system according to claim 12, further comprising a comparator module in either one of the telepresence controllers to produce a reference force from the position data, the reference force being calculated from a comparison of the current position of the end effector and of the position of the object in the remote telepresence session.

18. The telepresence system according to claim 17, wherein one of the force controller modules determines the force input on the end effector from the reference force and the at least one force measured by the at least one force sensor.

19. The telepresence system according to claim 12, further comprising a position adjustor module in either one of the telepresence controllers for scaling the position data, whereby a displacement resulting from the force input is a scaled proportion of a displacement of the object in the remote telepresence session.

20. The telepresence system according to claim 12, further comprising a force adjustor in either one of the telepresence controllers for scaling the force data, whereby the force input is a scaled proportion of a force on the object caused by the haptic events on the end effector operated by the other telepresence controller.

* * * * *